United States Patent
Lindeman et al.

(10) Patent No.: US 8,418,709 B2
(45) Date of Patent: Apr. 16, 2013

(54) TEMPORARY SHELTER AND MOBILE CART

(75) Inventors: Eric Lindeman, Venice, CA (US);
Miguel (Mike) de Jesus Orozco,
Lakewood, CA (US); Peter Samuelson,
Los Angeles, CA (US)

(73) Assignee: EDAR Everyone Deserves A Roof Inc.,
Los Angeles, CA (US)

( * ) Notice: Subject to any disclaimer, the term of this patent is extended or adjusted under 35 U.S.C. 154(b) by 294 days.

(21) Appl. No.: 12/730,161

(22) Filed: Mar. 23, 2010

(65) Prior Publication Data

US 2010/0243012 A1    Sep. 30, 2010

Related U.S. Application Data

(60) Provisional application No. 61/162,957, filed on Mar. 24, 2009.

(51) Int. Cl.
*E04H 15/06* (2006.01)
*E04H 15/30* (2006.01)

(52) U.S. Cl.
USPC ......... 135/96; 135/88.02; 135/88.13; 135/95; 280/47.18; 280/651; 5/414

(58) Field of Classification Search .................... 135/87, 135/88.1, 88.13, 88.15–88.16, 96, 88.02, 135/95; 280/47.18, 47.28, 79.11, 79.13, 280/651, 655, 655.1, 415.1, 416.1, 408; 5/113, 5/414–415; 414/802, 812, 541; 211/175, 211/189, 601; 52/79.5, 143
See application file for complete search history.

(56) References Cited

U.S. PATENT DOCUMENTS

| | | | | |
|---|---|---|---|---|
| 1,702,010 A | * | 2/1929 | Klever | 296/20 |
| 2,224,087 A | * | 12/1940 | Reichert | 5/625 |
| 3,147,497 A | * | 9/1964 | Diaz | 5/415 |
| 3,278,953 A | * | 10/1966 | Willis | 5/113 |
| 3,536,083 A | * | 10/1970 | Reynolds | 5/415 |
| 3,601,825 A | * | 8/1971 | Moorhead et al. | 5/110 |
| 3,619,827 A | * | 11/1971 | Mackenzie | 5/113 |
| 3,753,590 A | * | 8/1973 | Couix | 296/161 |
| 3,763,507 A | * | 10/1973 | Propst | 5/100 |
| 4,194,785 A | | 3/1980 | Cox et al. | |

(Continued)

FOREIGN PATENT DOCUMENTS

| | | |
|---|---|---|
| CA | 2443254 | 3/2005 |
| DE | 20105646 | 10/2001 |

(Continued)

OTHER PUBLICATIONS

Photographs of carts in www.moralityinmotion.com retrieved from http://static.flickr.com/78/159011348 a4cdd26dec.jpg?v=0. Retrieved on Oct. 25, 2006.

(Continued)

*Primary Examiner* — Winnie Yip
(74) *Attorney, Agent, or Firm* — Knobbe Martens Olson & Bear LLP

(57) ABSTRACT

Embodiments of the invention are generally related to a mobile shelter. In particular, several embodiments relate more particularly to a movable storage container configured for interconversion between various configurations. In several embodiments, the mobile shelter is configured as a shelter adequate for protection of its occupants against the elements. In several embodiments, the shelter optionally converts into a collapsed configuration suitable for transportation.

13 Claims, 6 Drawing Sheets

U.S. PATENT DOCUMENTS

| | | | |
|---|---|---|---|
| 4,523,768 A * | 6/1985 | Dlubala | 280/42 |
| 4,631,877 A | 12/1986 | Molodecki | |
| 4,914,768 A | 4/1990 | Howard | |
| 5,096,214 A | 3/1992 | Walker et al. | |
| 5,228,716 A | 7/1993 | Dahl | |
| 5,448,853 A | 9/1995 | Harman | |
| 5,622,198 A | 4/1997 | Elsinger | |
| 6,036,209 A | 3/2000 | Tsumura et al. | |
| 6,739,617 B1 | 5/2004 | Martin | |
| 6,923,458 B2 | 8/2005 | Hooper et al. | |
| 8,011,686 B2 * | 9/2011 | Chen et al. | 280/651 |
| 2002/0088171 A1 * | 7/2002 | Shepherd | 47/17 |
| 2005/0067802 A1 | 3/2005 | Lambert | |

FOREIGN PATENT DOCUMENTS

| | | |
|---|---|---|
| FR | 2788676 | 7/2000 |
| GB | 2225985 A * | 6/1990 |
| JP | 2002-225719 | 8/2002 |

OTHER PUBLICATIONS

Hawley, Chuck. Roof Over Head. The Arizona Republic. Jun. 8, 1990.

Home Away From Home. Metro Phoenix Magazine, Jan. 1989.

Product catalog for Turtle Pack: Instant Tent—A Comfortable Individual Sleeping Tent. Turtle Pack Sporting Goods Co. (AZ). Published on or before Apr. 10, 1990.

Google image search results for "wodiczko homeless" in 2 pages. Retrieved on Oct. 19, 2006. <http://images.google.com/images?hl=en&lr=&q=wodiczko%20homeless&sa=N&tab=wi>.

Musician invents insta-tent for campers, homeless. The Glendale Start, Nov. 2, 1988.

* cited by examiner

TEMPORARY SHELTER AND MOBILE CART

BACKGROUND

1. Field of the Invention

Embodiments of the invention are generally related to a mobile shelter, and more particularly to a movable storage container that converts into a shelter adequate for protecting humans from the elements, and optionally converts into a collapsed configuration suitable for transportation.

2. Description of the Related Art

Homelessness is an ever-present fact of life in our country. It has been estimated that over three million people live on the streets of American cities each year. In many communities, particularly in rural areas, few public shelters exist. In America's cities, where shelters are more common, the shelters are often operated by philanthropic, governmental, and religious initiatives. Such shelters may not be a viable option for many of America's homeless, who are unwilling to be housed under the stipulations and conditions imposed by the entities providing the shelter.

While other temporary and permanent homeless shelters exist throughout the country, they generally seek to reintegrate the homeless into society; however, they fail to provide solutions for the significant proportion of the homeless that choose not to reintegrate, that are mentally ill, or those that do not have access to such shelters. Accordingly, many of America's homeless resort to misappropriated shopping carts, as they require mobility and a means for taking their personal belongings with them as they move. As housing costs rise throughout the country, increasing numbers of individuals and families are forced to the streets.

Similarly, natural disasters leave countless people without shelter every year. Throughout the world, homes are devastated by hurricanes, floods, earthquakes, tsunamis, fires, and war. In the wake of these disasters, many lives are compromised as no mobile shelters are readily available.

SUMMARY

While numerous carts and temporary shelters have been developed, they have generally been designed to either transport materials or shelter people, but not both. Accordingly, there is a need in the art for a mobile shelter that is capable of converting from a moveable storage container into a shelter that adequately protects humans from the elements. There is also a need for such mobile shelters to be easily transportable, for example by collapsing into a configuration that reduces the space required to transport the mobile shelter.

In several embodiments, the mobile shelter is a four-wheeled mobile unit which carries belongings and facilitates recycling during the day and unfolds into a special, framed tent-like sleeping enclosure with a bed at night. Several embodiments described herein provide shelter in an innovative cost and usage effective way.

In several embodiments, the mobile shelter is used to pursue the necessities of life during the day. Personal belongings are secured by the use of one or more locks. The front and back of the cart may optionally include storage baskets with removable pouches. The unit is waterproof and provides protection for the items it contains. The wheels are, in some embodiments, slightly larger and easier to steer in a consistent fashion as compared to a standard supermarket cart. In some embodiments, there are one or more brake and/or locking mechanisms which ensure that the unit will not move on its own. At night, the unit easily hinges out and down to "Night Mode" in a short period of time (e.g., less than 10 seconds, 20 seconds, 30 seconds, 45 seconds, 60 seconds, 2 minutes, 5 minutes, etc.), thereby becoming a sleeping unit. Unfolding the unit allows it to lock in place as the flat metal base extends. The metal and wood base has a mattress and a cover (e.g., military-grade canvas), providing a robust tent-like shelter. In several embodiments, the unit is flame-retardant, waterproof, windproof and helps protect the individual (and/or the goods) from the elements. Optional translucent windows provide light and a view of the surrounding area. By re-folding the unit, several embodiments of the device quickly return to "Day Mode". In some embodiments, one more brakes are provided in both Day Mode and Night mode.

In several embodiments, the mobile shelter quickly and easily converts to a mobile cart that is pushable by a single individual. The shelter, according to some embodiments, is constructed of materials designed to provide temporary accommodation. The shelter's size and construction are, in certain embodiments, designed to provide devices that are more economical than standard mobile homes and recreation vehicles. In several embodiments, the shelter transforms into a mobile cart for transporting items. In other embodiments, the shelter is collapsible to permit rapid transport to areas of need (e.g., for large homeless populations due to natural disasters, etc).

In several embodiments, the mobile shelter comprises a chassis coupled to a plurality of wheels, at least one primary support connected to the chassis, at least one frame hingeably connected to the chassis such that the frame is moveable between a first mobile cart position wherein the frame is substantially perpendicular to the chassis, and a second shelter position wherein the frame is substantially parallel to the chassis and coplanar with the chassis. A covering (preferably weatherproof) is optionally provided to enclose at least a portion of the shelter. The covering may be connected to the frame and supported by the primary support such that a weather-protected interior volume is formed, wherein the interior volume provides shelter when the frame is in the shelter position.

In some embodiments, the invention comprises a mobile shelter capable of converting between a first cart position, a second shelter position, and a third collapsed position. Intermediate collapsed formats, e.g. for stacking, transport, or storage are provided in some embodiments. Several embodiments comprise a chassis coupled to a plurality of wheels and two substantially rigid primary support structures hingeably connected to the chassis. Each primary support structure comprises two sides that are perpendicular to the chassis in the first cart and second shelter positions. Several embodiments also comprise a top connecting the two sides of the primary support structure. The top comprises a center portion that is substantially parallel to the chassis in the first cart and second shelter positions, and includes end portions that extend at an angle of about 30 degrees to about 60 degrees from the center portion towards each side of the primary support structure. One or both primary support structures are able to fold downwards such that they may lie substantially parallel to the chassis in the third collapsed position. The mobile shelter further comprises two frames hingeably connected to the ends of the chassis, the frames being moveable among three positions. In the first position (the cart position), the frames are substantially perpendicular to the chassis. In the second position (the shelter position), the frames are substantially parallel to the chassis and coplanar with the chassis. In the third position (the collapsed position), a lowered portion of each frame lies substantially parallel to and above the chassis. The device further comprises two secondary supports, one hingeably connected to each frame, moveable between the second shelter position wherein the secondary supports are substantially perpendicular to the chassis and the third collapsed position wherein the secondary supports lie between the lowered portion of the frame and the base.

In several embodiments, the mobile shelter additionally comprises a weatherproof covering enclosing at least a portion of the shelter. In some embodiments, the covering is connected to the frame and supported by the primary support structures and secondary supports when the cart is in the second shelter position such that a weather-protected interior volume is formed and the interior volume capable of sheltering the occupant(s). In some embodiments, the mobile system is designed to house one adult human. In other embodiments, two or more humans are accommodated. In yet other embodiments, the shelters are designed to house animals.

In several embodiments, the mobile shelter is sufficiently lightweight to allow it to be moved by a single adult human when the mobile shelter is in the cart position. In one embodiment, the device weighs about 25 pounds to about 200 pounds. In one embodiment, the device weighs about 90 pounds to about 125 pounds, e.g., about 120 pounds. In several embodiments, the mobile shelter is dimensioned to shelter an adult person. The device (in the shelter position) ranges from about 5 feet to about 12 feet in length and about 2 feet to about 6 feet in width. In some preferred embodiments, the shelter is about 8 feet long and about 3 feet wide. In several embodiments, the device (in the shelter position) is about 2 feet to about 6 feet high, preferably about 3 feet to about 5 feet high. In one embodiment, the cart measures (i) about 57 inches in length, about 34 inches in width, and about 43 inches in height in the closed position; (ii) about 94 inches in length, about 34 inches in width, and about 43 inches in height in the open position; and (iii) about 47 inches in length, about 34 inches in width, and about 24 inches in height in the collapsed position. Other dimensions may also be used.

In several embodiments, the collapsed configuration has at least one dimension that is about 10% to about 75% (e.g., about 10%-20%, about 20%-30%, about 30%-40%, about 40%-50%, about 50%-60%, about 60%-75%, or overlapping ranges therein) the size of the shelter position and/or the cart position. In one embodiment, the collapsed configuration has at least two dimensions that are about 25% to about 50% the size of the shelter position and/or the cart position. The collapsed and/or partially collapsed position, according to several embodiments, facilitates economical and rapid transport of the units to areas of need. In the collapsed and/or partially collapsed position, the units are stackable according to one embodiment.

The wheels have a diameter of about 2 inches to about 10 inches in some embodiments, and about 3 inches to about 5 inches in other embodiments. Smaller or larger wheels may also be used. In some embodiments, the device has three, four, or more wheels that may be sized identically or have different sizes.

According to any of the embodiments described herein, the mobile shelter includes one or more storage compartments that are coupled (attached or otherwise connected) to the shelter. In other embodiments, at least one handle is connected to the shelter. Two, three, four or more handles are provided according to some embodiments. In several embodiments, a mattress or padding is provided to enhance comfort. In certain such embodiments, the mattress or padding is weatherproof.

In several embodiments of the invention, a method of converting a mobile shelter from a collapsed configuration to a cart configuration to a shelter configuration is provided. In some embodiments, the method comprises converting the mobile shelter from a collapsed configuration to a cart configuration, wherein the mobile shelter comprises a chassis coupled to a plurality of wheels, two substantially rigid primary support structures hingeably connected to the chassis, two frames hingeably connected to the ends of the chassis, and two secondary supports, one hingeably connected to each frame. The method, according to one embodiment, comprises: (i) raising the frames from a position substantially parallel to and above the chassis to a position substantially perpendicular to the chassis; (ii) raising the primary support structures from a position substantially parallel to the chassis to a position substantially perpendicular to the chassis; (iii) converting the mobile shelter from the cart configuration to a shelter configuration; (iv) lowering the frames such that the frames are substantially parallel to the chassis and coplanar with the chassis, wherein the frames and chassis form a substantially flat base capable of supporting the weight of an adult human (or desired occupant(s)); (v) raising the secondary supports from the frames such that the secondary supports are substantially perpendicular to the base, and substantially parallel to the two primary supports; (vi) creating an interior volume by attaching a weatherproof covering around the primary supports, secondary supports, and base, such that the interior volume is capable of containing and sheltering an adult human from the elements. The steps above need not be performed in the order indicated, and one or more of the steps can be omitted.

DETAILED DESCRIPTION OF EMBODIMENTS

In one embodiment, the mobile shelter comprises a wheeled cart capable of multiple configurations, including a first mobile cart configuration, a second shelter configuration, and a third collapsed configuration. The following description and examples illustrate some embodiments of the mobile shelter in detail. Numerous variations and modifications are encompassed by the scope of this application. Accordingly, descriptions of certain embodiments should not be deemed to limit the scope of the present disclosure.

In several embodiments, the invention comprises a convertible mobile shelter. The shelter, in one embodiment, comprises a chassis coupled to a plurality of wheels, a base coupled to the chassis, at least one frame hingeably connected to the chassis, a weatherproof covering enclosing at least a portion of the shelter. In one embodiment, the frame is moveable between a first position wherein the frame is substantially perpendicular to the chassis, and a second position wherein the frame is substantially parallel to the chassis and coplanar with the chassis. In one embodiment, the covering forms a weather-protected interior volume. In one embodiment, the shelter ranges from about 5 feet to about 12 feet in length and about 2 feet to about 6 feet in width when the frame is in the second position.

Figure 1:
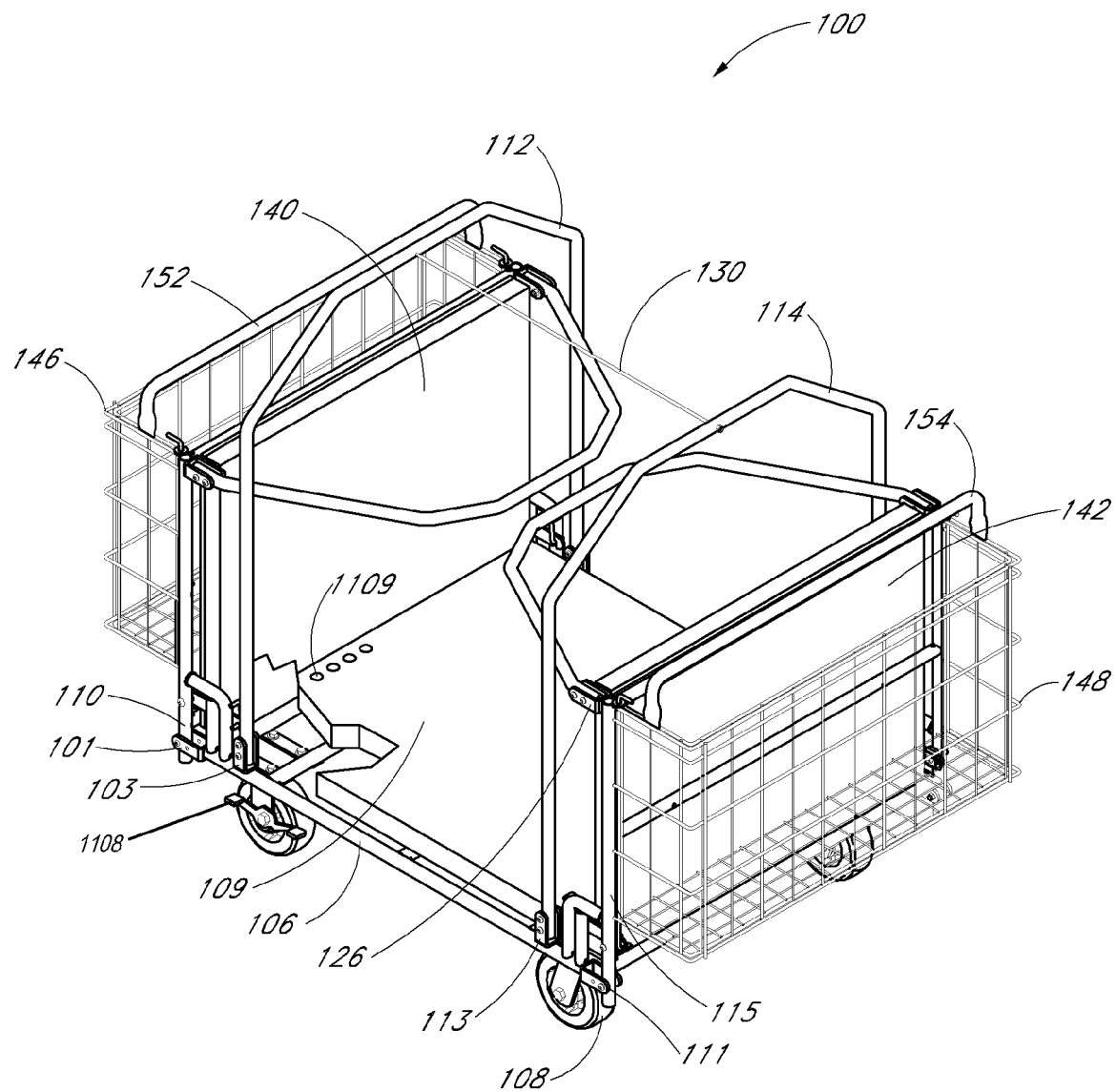
FIG. 1 illustrates one embodiment of the mobile shelter disclosed in the present application in a first configuration, also referred to herein as the "cart configuration."

FIG. 1 illustrates one embodiment of the mobile shelter 100 disclosed in the present application in a first configuration, also referred to herein as the "cart configuration." In this configuration, the mobile shelter 100 generally defines an interior volume. As used herein, any reference to the "interior" refers to the portion of the structure that is closest to the interior volume defined by the mobile shelter 100, whereas "exterior" refers to the outer portion of the structure.

As illustrated in FIG. 1, the mobile shelter 100 comprises a chassis 106. The chassis 106 is substantially parallel to the ground and provides the primary base support for the mobile shelter 100. In some embodiments, the chassis 106 has a rectangular shape, although any shape chassis 106 may be used. The chassis is connected to a plurality of wheels 108, enabling the mobile shelter 100 to roll across a surface. The chassis 106 provides structural support for the base 109 of the mobile shelter 100. In one embodiment, the device has one wheel, two wheels, three wheels, four wheels, or more.

In one embodiment, the base 109 is horizontal in relation to the surface over which the cart is rolling, for example the ground. In some embodiments, the base 109 is fixedly attached to the chassis 106. In other embodiments, the base 109 is removable from the chassis 106. In some embodiments, the base 109 is perforated with perforations 1109 (shown as cylindrical perforations, though other embodiments may optionally comprise other shapes of perforation) to allow fluid, such as rainwater, to drain from the base 109. In some embodiments, the base 109 may be adapted to provide extra comfort for an occupant, for example by adding padding to the base 109.

The chassis 106 is connected to first frame 110. The first frame 110 defines one side of the mobile shelter 100 when in its cart configuration. In some embodiments, the first frame 110 is hingeably attached to the chassis 106. For example, in the embodiment illustrated in FIG. 1, hinging mechanisms 101 allow the first frame 110 to move about an axis defined by an edge of the chassis 106. The amount of movement of the first frame 110 will depend on the hinging mechanism 101 used. In some embodiments, the first frame 110 is able to move such that the first frame 110 lies on top of the chassis 106 or base 109 if the first frame is moved in a direction towards the interior of the mobile shelter 100. In some embodiments, the first frame 110 may be moved towards the exterior of the mobile shelter 100, such that the first frame rests on or near the ground. Various methods for allowing the first frame 110 to move relative to the chassis 106 in the desired manner can be employed according to several embodiments of the invention.

As illustrated in FIG. 1, a first wall 140 may be formed by coupling a solid surface to the interior of the first frame 110. This first wall 140 assists in containing items within the cart when the mobile shelter 100 is in its first cart configuration.

As illustrated in FIG. 1, a second frame 115 and second wall 142 may also be attached to the chassis 106 opposite the first frame 110 and first wall 140. Hinges 111 allow movement of the second frame in a similar manner to the movement described with respect to the first frame.

The mobile shelter 100 may further comprise compartments 146, 148 for storing the user's personal belongings. The compartments 146, 148 may be any shape or size, and located in various positions on the mobile shelter 100. In the embodiment illustrated in FIG. 1, the compartments 146, 148 are attached to frames 110, 115.

The mobile shelter may have a handle to assist the user in moving the shelter. In the embodiment illustrated in FIG. 1, handles 152, 154 are attached to the top of the compartments, 146, 148. The handles may be of various shapes and sizes. In some embodiments, the handles are attached to frames 110, 115.

The chassis 106 may be connected to at least one vertical support structure, which defines the height of the mobile shelter. The embodiment illustrated in FIG. 1 comprises two primary support structures 112, 114. The primary support structures 112, 114 provide the height and covering support for the structure. In the embodiment illustrated in FIG. 1, the primary support structures 112, 114 extend substantially vertically from the chassis 106, bend and extend substantially horizontally across the width of the chassis 106, and then extend vertically to the chassis 106. The support structures 112, 114 could be replaced by support structures of various shapes and sizes to obtain the desired characteristics, including roof line. For example, the two support structures 112, 114 shown in FIG. 1 may be replaced by four posts extending vertically from each corner of the chassis 106. In some embodiments, support structures 112, 114 may be unnecessary, as the first and second frames 110, 115, or the first and second walls 140, 142, may adequately support the covering of the mobile shelter 100 (not shown in FIG. 1).

In some embodiments, one or more primary support structures may be hingeably or releaseably attached to the chassis 106. In the embodiment illustrated in FIG. 1, primary support structures 112, 114 are connected to the chassis 106 at hinges 103. Hinges 103 allow the primary support structures 112, 114 to fold inward and lay substantially parallel to the chassis 106 when the mobile shelter is in its third configuration.

In some embodiments, the primary support structures may be connected by one or more top support 130, which may extend across the top of the structure between the primary support structures. In some embodiments, the top support is parallel to the base 109. The primary support structures 112, 114 and top support 130 may be formed of any rigid material substantially capable of maintaining its shape when exposed to the elements, for example strong winds. In some preferred embodiments, the primary support structures 112, 114 and top support 130 comprise a lightweight metal such as aluminum, although other metals and alloys may be used. In other embodiments, the primary support structures 112, 114 and top support 130 may comprise lightweight composite materials, plastics, and the like. Carbon fiber and/or fiberglass may be used in some embodiments.

Figure 2:
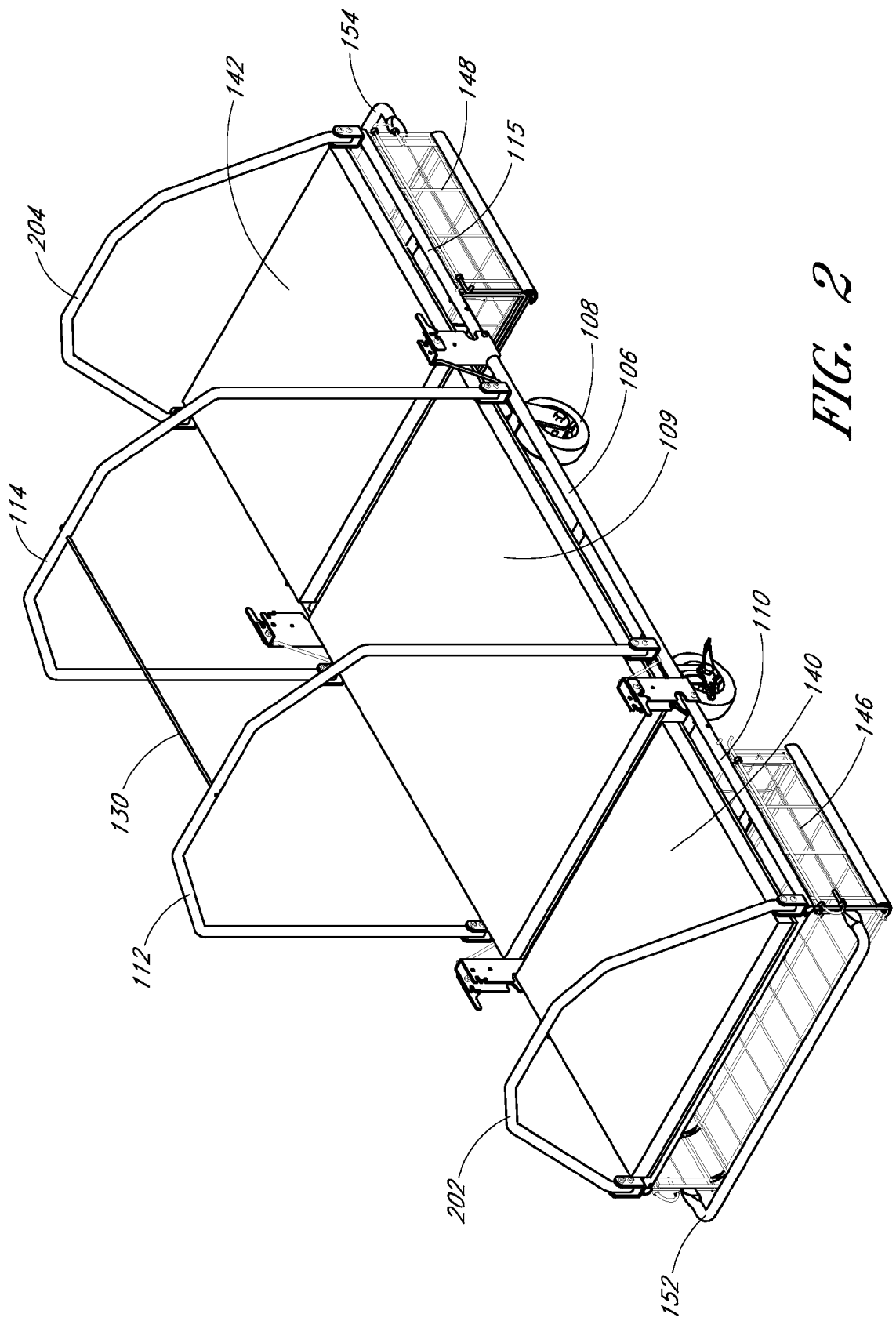
FIG. 2 illustrates one embodiment of a mobile shelter in a second configuration, also referred to herein as the "shelter configuration."

FIG. 2 illustrates a mobile shelter 100 in a second configuration, sometimes referred to herein as the "shelter configuration." In the shelter configuration, the mobile shelter 100 provides a living space sufficient for a human adult to lie down. In several embodiments, the shelter can accommodate 2-3 individuals.

As illustrated in the embodiment shown in FIG. 2, the first frame 110 hinges relative to the chassis 106 such that the first wall 140 serves as an extension of the base 109. In several embodiments, the first and second frame may optionally be positioned in a similar manner in the shelter configuration (e.g., both positioned substantially co-planar with the base 109) as illustrated in FIG. 2. In some embodiments, the second frame 115 is moved about the hinges 113 to allow the second wall 142 to further extend the sleeping area available for the occupant. Alternatively, one frame may be positioned substantially co-planar with the base 109 while the other is maintained in a position perpendicular to the base 109.

In the embodiment illustrated in FIG. 2, compartments 146, 148 function as supports for the first and second frames 110, 115, and the compartments 146, 148 are sized such that the first and second frames 110, 115 are substantially co-planar with the chassis 106 and such that the first and second walls 140, 142 are substantially co-planar with the base 109. A variety of mechanisms can be used to support the first and second frames 110, 115 when the mobile shelter 100 is in its shelter configuration to provide a sleeping surface, which comprises the base 109 and optionally the front wall 140 and optionally the second wall 142, that is substantially horizontal. By way of example only, the first and second frames may be supported by one or more legs that would serve as handles when the mobile shelter 100 is in the cart configuration. Alternatively, the hinges 101 may be mechanically limited such that the first and/or second frames 110, 115 cannot hinge and/or rotate beyond the point at which the first and/or second frames 110, 115 are substantially co-planar with the chassis 106.

As illustrated in FIG. 2, at least one primary vertical support structure may be used to provide height to the mobile shelter 100 and increase the interior volume of the shelter. FIG. 2 shows two primary vertical support structures 112, 114, which provide support for the covering of the shelter. A top support member 130 may extend between the primary vertical support structures 112, 114 to further support the covering of the shelter 100. As previously described, various shapes and sizes of posts, beams, and other support members may be used in place of the primary vertical support structures 112, 114 illustrated in FIG. 2.

The shape of the mobile shelter may be defined by various secondary support members. For example, in the embodiment illustrated in FIG. 2, the first and second frames 110, 115 are connected to secondary support structures 202, 204. One or more secondary support structures of a suitable shape or size can be used to define the desired shape of the interior volume. In one embodiment, the secondary support structure will be hingeably or releasably connected so that the mobile shelter 100 can easily be converted into a third collapsed configuration. In the embodiment illustrated in FIG. 2, secondary support structures 202, 204 may be hingeably connected to the first and second frames 110, 115.

The mobile shelter 100 may be capable of converting to a third, collapsed configuration, which enables easy transport of the mobile shelter 100. Intermediate collapsed formats, e.g. for stacking, transport, or storage are provided in some embodiments.

In several embodiments, the mobile shelter embodiments described herein are adapted for campers and outdoor activities. In some embodiments described herein, the shelter may comprise security features. In one embodiment, alarms and/or cameras are provided. In another embodiment, one or more locks are provided. In other embodiments, tracking features (such as GPS devices) are incorporated into the system.

Figure 3A:
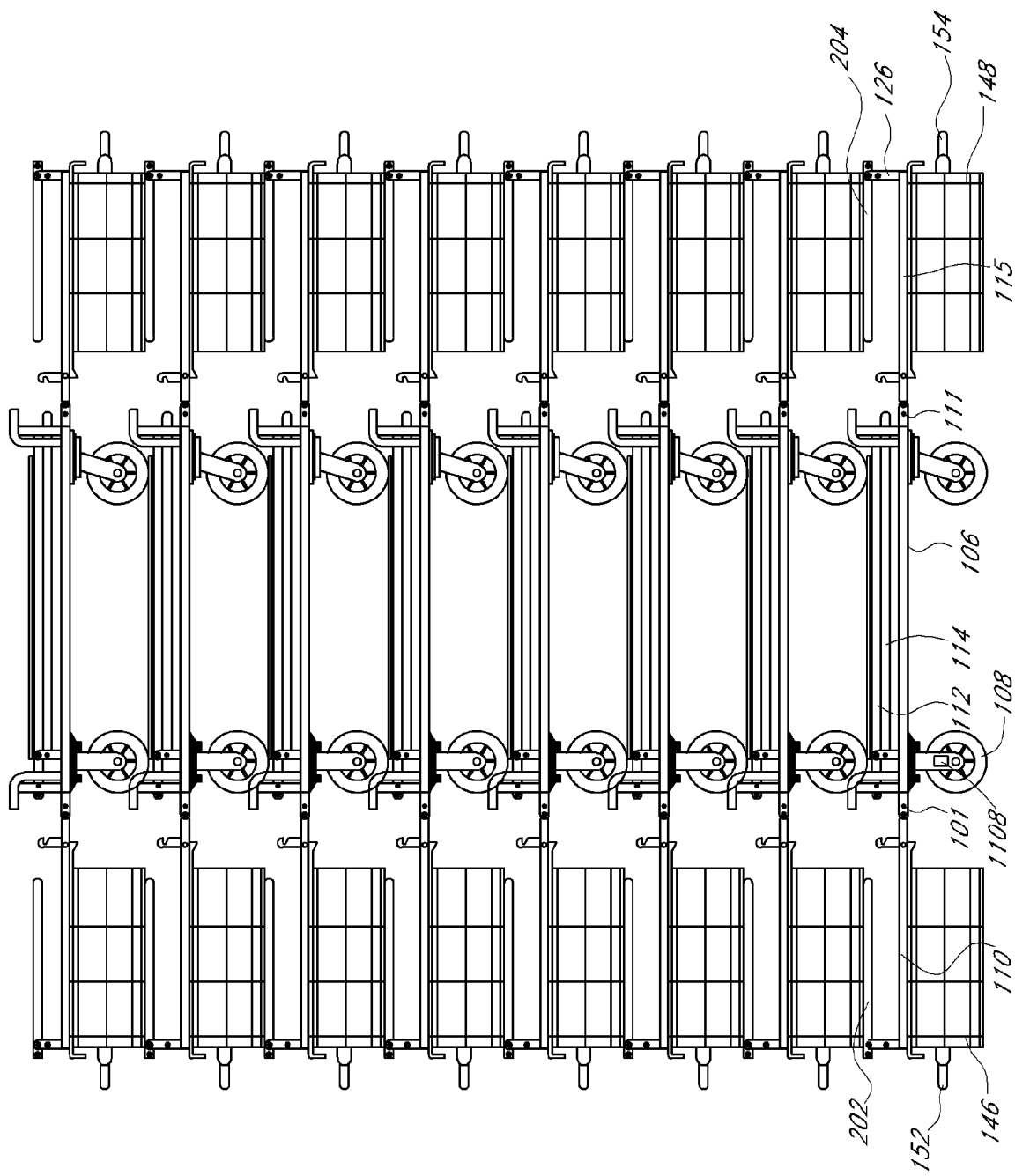
FIG. 3A illustrates a plurality of stacked mobile shelters.

FIG. 3A illustrates a plurality of mobile shelters, each shown partially collapsed and stacked on top of one another. As illustrated in FIG. 3A, the hingeably connected primary vertical support structures 112 and 114 may be lowered and are substantially parallel to the chassis 106. In the illustrated embodiment, the primary vertical support structures are flat against the chassis to minimize the space required to store stacked shelters. However, in some embodiments, the primary vertical support structures 112 and 114 are not positioned flat against the chassis 106.

As further illustrated in FIG. 3A, the first frame 110 is rotated about hinging mechanism 101 such that the first frame is substantially co-planar with the chassis 106 and supported by compartment 146. The second frame 115 is similarly rotated about hinging mechanism 111 and is supported by compartment 148. Secondary supports 202 and 204 are rotated by means of secondary support hinges 126 to allow the secondary supports to lie substantially co-planar to, but above, frame 110 and 115, respectively. When stacked, the wheels 108 of the first partially collapsed shelter rest on the ground or surface of a transport mechanism. The wheels of subsequently stacked carts rest on the lowered primary vertical support structures 112 and 114. In certain embodiments discussed herein, the wheels 108 of the shelter optionally comprise a brake or locking mechanism 1108 to prevent unwanted movement of the shelter. Advantageously, when the wheels of the first shelter are unlocked, the handle 152 or 154 of any of the carts may be used to maneuver the stack of carts into a desired position for transport or storage. Moreover, the wheels of one or more of the shelters may be locked to prevent unwanted movement of the stacked shelters during transport or storage.

Figure 3B:
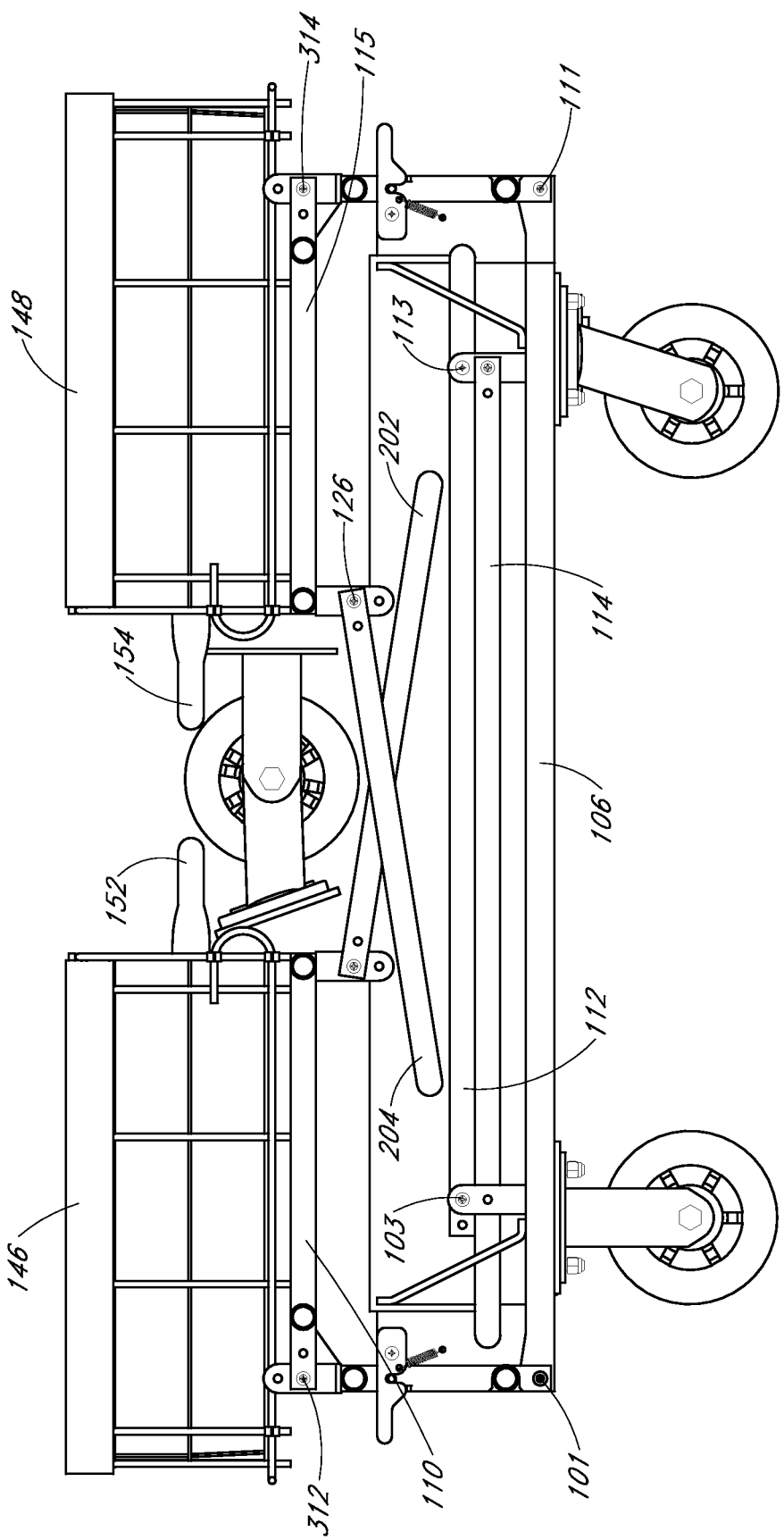
FIG. 3B illustrates one embodiment of a mobile shelter in a third configuration, also referred to herein as the "collapsed configuration."

FIG. 3B illustrates one embodiment of a mobile shelter 100 in its collapsed configuration. As illustrated in FIG. 3B, the hingebly connected primary vertical support structures 112 and 114 may be lowered and are substantially parallel to the chassis 106. In some embodiments, the primary vertical support structures are flat against the chassis to minimize the space required to store the structure in its collapsed configuration.

As further illustrated in FIG. 3B, the first frame 110 is folded at hinge 312 such that the section of the frame below the hinge remains substantially upright and perpendicular to the chassis 106, while the portion of the frame above the hinge is lowered to lie substantially parallel to the chassis 106. As shown, the second frame 115 is similarly folded at hinge 314. In the collapsed configuration, as shown, the secondary supports 202 and 204 may be rotated by means of secondary support hinges 126 to allow the secondary supports to lie between the upper portion of the frames and the main supports in their lowered position. As shown, the first and second secondary supports are rotated away from the first and second frame respectively, such that the first secondary support 202 is angled beneath the second frame 115, and the second secondary support 204 is angled beneath the first frame 110. In other embodiments, each secondary support could rotate towards the frame to which it is attached such that it fits substantially flat beneath the frame to which it is attached. In other embodiments, the secondary supports could be removable instead of hinged, such that they may be stored flat against the main supports in the lowered position.

As shown, compartments 146, 148 remain attached to the frames 110, 115 such that when the shelter is in its collapsed configuration, the compartments sit flat above the top of the collapsed structure. The handles 152 and 154, as shown, remain attached to the compartments, positioned between the compartments at the top center of the collapsed structure. In some embodiments the handles and/or compartments may be removable such that they may be stored separately from the rest of the structure. In other embodiments, the structure may not include handles, or may not include compartments.

Figure 4:
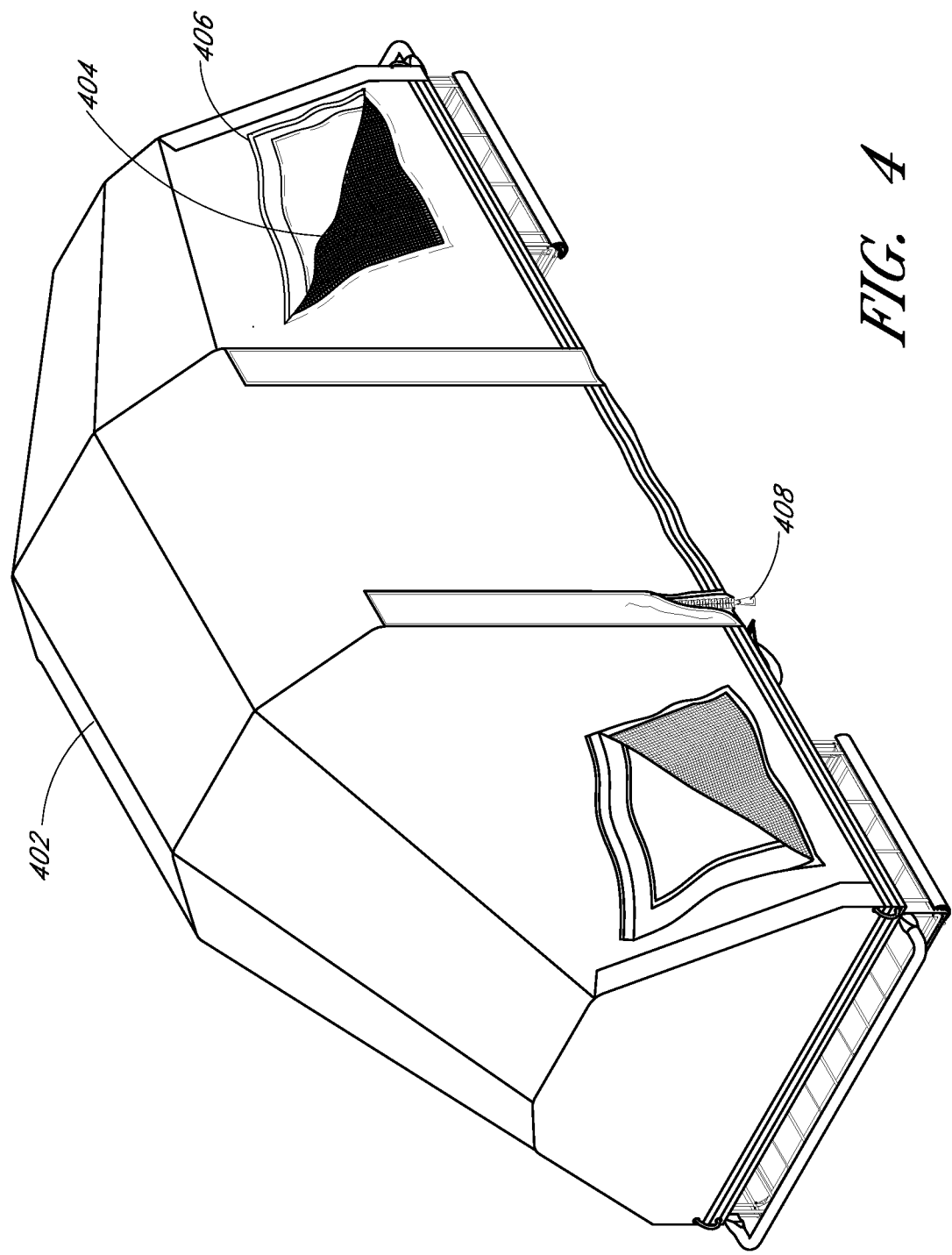
FIG. 4 illustrates one embodiment of a mobile shelter in the shelter configuration with a weatherproof covering.

FIG. 4 illustrates the mobile shelter 100 in its shelter configuration, as shown in FIG. 2. As can be seen from the embodiment illustrated, the covering 402 provides shelter to the occupant of the mobile shelter. In one embodiment, the covering is waterproof and/or windproof to protect the occupant from the elements. In some embodiments, the covering may comprise one or more windows 404, which allow an occupant inside the shelter to view the surroundings outside the shelter. The windows may have a removable covering 406 to provide additional privacy and protection from the elements when the window is covered. The covering 402 may also comprise one or more closeable entry points 408 for entry and exit from the structure. In certain embodiments, the entry point 408 is reversibly openable by way of a zipper, snaps, buttons, hook and loop closure, or other similar devices. In certain embodiments comprising two or more closeable entry points, certain points may be joined together to convert the covering 402 for the shelter configuration into the cover 502 for the cart configuration.

In one embodiment, the covering is made of plastic material and/or other polymers. Tent material is used in several embodiments. In some embodiments, the covering has a weight of 20-200 grams per 1000 meter of the thread used in the fabric. In several embodiments, the fabric is 25 d, 50 d, 75 d, or 100 d. In some embodiments, the cover is water resistant. In some embodiments, the covering is 20-200 psi, e.g., 25 psi, 50 psi, 75 psi, or 100 psi (pound per square inch with respect to the weight of water that can exert pressure on a square inch of the fabric without leaking).

In other embodiments, the covering comprises nylon, polyethylene, polypropylene, polyurethane, or combinations thereof. In yet other embodiments, the covering is a cloth material that is optionally layered with a waterproof plastic material. Canvas is used in some embodiments. In alternative embodiments, the covering is coated with a waterproof coating. Waterproof or breathable laminates are used in some embodiments. The covers may use a layering system of different materials to form a strong and waterproof but breathable fabric (including, but not limited to, polytetrafluoroethylene and other fluoropolymer products).

Figure 5:
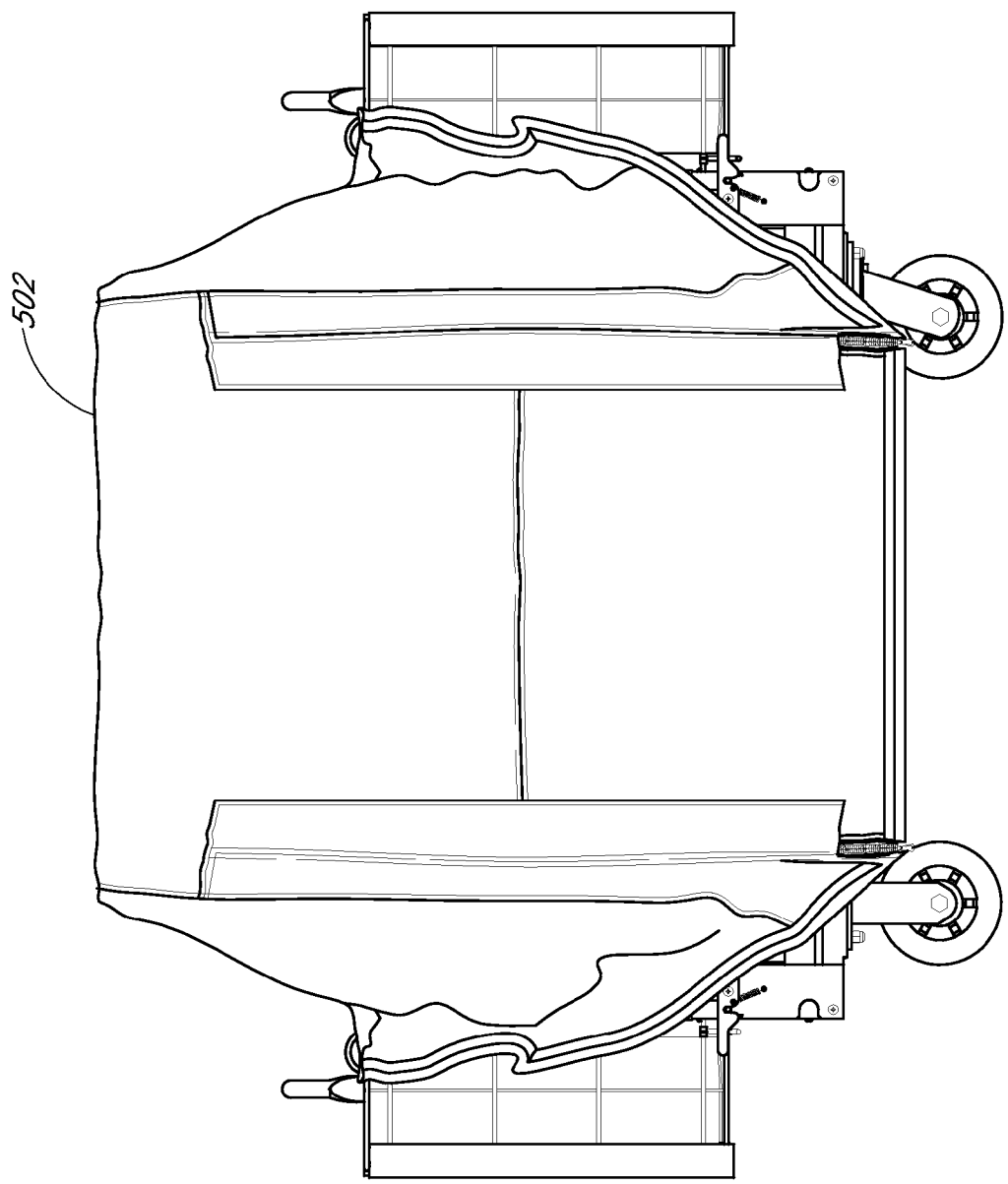
FIG. 5 illustrates one embodiment of a mobile shelter in the cart configuration with a weatherproof covering.

FIG. 5 illustrates the mobile shelter 100 in its cart configuration, as shown in FIG. 1. As can be seen from the embodiment illustrated, the covering 502 provides protection for items stored within the cart while in its cart configuration. Preferably the covering is waterproof and/or windproof to protect the stored items from the elements. Any variety or combination of fabrics discussed above may be used for the covering of the cart configuration. In certain embodiments, as discussed above, the cover 502 for the cart configuration is created by coupling one or more of the points of entry 408 of the cover 402 for the shelter configuration. In certain other embodiments, the cover 502 is a separate cover. Coupling can include joining, attaching, or operably coupling with or without an intermediary.

Embodiments of the invention have are described above. While the structure has been described in terms of certain specific embodiments, there is no intention to limit the invention to the same. It will be understood that the foregoing is only illustrative of the principles of the invention, and that various modifications, alterations, and combinations can be made by those skilled in the art without departing from the scope and spirit of the invention.

What is claimed is:

1. A mobile shelter capable of converting between a first cart position, a second shelter position, and a third collapsed position, comprising:
    a chassis having a first end and a second end, the chassis coupled to a plurality of wheels;
    a base coupled to the chassis;
    two substantially rigid primary support structures hingeably connected to the chassis, each primary support structure comprising two side portions and a top portion connecting the two side portions, the two side portions being perpendicular to the chassis in the first cart and second shelter positions and the top portion having a center portion that is substantially parallel to the chassis in the first cart and second shelter positions, and having end portions that extend at an angle from the center portion towards each side of the primary support structures;
    wherein both primary support structures are able to fold downwards such that they may lie substantially parallel to the chassis in the third collapsed position;
    two frames hingeably connected to the ends of the chassis, the frames being moveable between the first cart position, wherein the frames are substantially perpendicular to the chassis, the second shelter position wherein the frames are substantially parallel to the chassis and coplanar with the chassis, and the third collapsed position wherein a lowered portion of each frame lies substantially parallel to and above the chassis;
    two secondary supports, one hingeably connected to each frame, moveable between the second shelter position wherein the secondary supports are substantially perpendicular to the chassis and the third collapsed position wherein the secondary supports lie between the lowered portion of the frame and the base;
    a weatherproof covering enclosing at least a portion of the shelter, the covering connected to the frame and supported by the primary support structures, and the secondary supports when the mobile shelter is in the second shelter position such that a weather-protected interior volume is formed, the interior volume capable of sheltering an adult human;
    wherein the mobile shelter is configured to be movable by a single adult human when the mobile shelter is in the first cart position.

2. The mobile shelter of claim 1, wherein at least one storage compartment is connected to the shelter.

3. The mobile shelter of claim 1, wherein at least one handle is connected to the shelter.

4. The mobile shelter of claim 1, wherein a wall is coupled to each of said two frames.

5. The mobile shelter of claim 4, further comprising a weatherproof padding on one or more of said base or said wall.

6. The mobile shelter of claim 1, further comprising one or more locking mechanisms to prevent movement of the shelter when it is in the first mobile cart position.

7. The mobile shelter of claim 1, wherein the weight of said shelter is between about 25 and about 200 pounds.

8. The mobile shelter of claim 1, wherein the primary support comprises a rigid material capable of maintaining its shape.

9. The mobile shelter of claim 8, wherein said rigid material capable of maintaining its shape comprises aluminum.

10. The mobile shelter of claim 8, wherein said rigid material capable of maintaining its shape comprises a composite material.

11. The mobile shelter of claim 10, wherein said composite material comprises carbon fiber.

12. The mobile shelter of claim 1, wherein the shelter is suitable for stacking with a plurality of additional mobile shelters.

13. The mobile shelter of claim 1, wherein the base is perforated to allow fluid to drain from the base.

* * * * *